US012486969B2

(12) United States Patent
Ference

(10) Patent No.: US 12,486,969 B2
(45) Date of Patent: Dec. 2, 2025

(54) ARTICLE RETENTION SYSTEM

(71) Applicant: Level 5 Adaptive LLC, Raleigh, NC (US)

(72) Inventor: Patrick Ference, Raleigh, NC (US)

(73) Assignee: Level 5 Adaptive LLC, Raleigh, NC (US)

( * ) Notice: Subject to any disclaimer, the term of this patent is extended or adjusted under 35 U.S.C. 154(b) by 75 days.

(21) Appl. No.: 16/742,546

(22) Filed: Jan. 14, 2020

(65) Prior Publication Data

US 2022/0268428 A1 Aug. 25, 2022

(51) Int. Cl.

| | |
|---|---|
| ***F21V 21/08*** | (2006.01) |
| ***A47G 33/00*** | (2006.01) |
| ***F16M 13/02*** | (2006.01) |
| ***F21S 4/10*** | (2016.01) |
| ***F21V 21/088*** | (2006.01) |
| *F21W 121/04* | (2006.01) |

(52) U.S. Cl.
CPC .......... *F21V 21/0816* (2013.01); *A47G 33/00* (2013.01); *F16M 13/022* (2013.01); *F21S 4/10* (2016.01); *F21V 21/088* (2013.01); *F21W 2121/04* (2013.01)

(58) Field of Classification Search
CPC ...... F21V 21/0816; F21V 21/088; F21S 4/10; F16M 13/00; F16M 13/02; F16M 13/022; F21W 2121/04
See application file for complete search history.

(56) References Cited

U.S. PATENT DOCUMENTS

| | | | | | |
|---|---|---|---|---|---|
| 1,652,825 | A * | 12/1927 | Hechinger | G09F 13/28 | 362/249.14 |
| 2,722,317 | A * | 11/1955 | Goodwin | F21V 21/005 | 403/375 |
| 3,540,687 | A * | 11/1970 | Cuva | F21V 21/088 | 248/223.41 |
| 4,244,014 | A * | 1/1981 | Van Ess | F21S 4/10 | 362/654 |
| 4,335,422 | A * | 6/1982 | Van Ess | F21S 4/10 | 362/429 |
| 4,720,773 | A * | 1/1988 | Ahroni | F21S 4/10 | 362/249.16 |
| 4,769,749 | A * | 9/1988 | Felski | F21S 4/20 | 248/316.1 |
| 4,774,646 | A * | 9/1988 | L'Heureux | F21S 2/005 | 362/145 |
| 5,442,531 | A * | 8/1995 | Lee | F21V 21/0824 | 362/153.1 |
| 5,469,344 | A * | 11/1995 | Kotsakis | F21S 4/20 | 362/382 |
| 5,542,636 | A * | 8/1996 | Mann | F21V 21/08 | 362/396 |
| 5,700,083 | A | 12/1997 | Boechel | | |
| 5,788,361 | A * | 8/1998 | Lee | F21V 21/08 | 362/249.16 |

(Continued)

*Primary Examiner* — Monica E Millner
(74) *Attorney, Agent, or Firm* — FERENCE & ASSOCIATES LLC

(57) ABSTRACT

An article retention system, process, and lighting system that allows articles, particularly holiday string lighting, to be hung about organic bodies, e.g. trees, having a substantial height. The present invention obviates the need to either harm the organic entity for affixation or wind an elongate string about a tree.

19 Claims, 9 Drawing Sheets

(56) References Cited

U.S. PATENT DOCUMENTS

| | | | | | |
|---|---|---|---|---|---|
| 5,893,628 | A * | 4/1999 | Byers | F21V 3/02 | 362/396 |
| 5,957,568 | A * | 9/1999 | Byers | F21V 21/0824 | 362/249.11 |
| 6,050,701 | A * | 4/2000 | Stone | F21V 21/08 | 362/396 |
| 6,109,765 | A * | 8/2000 | Blanton | F21S 4/10 | 362/396 |
| 6,279,797 | B1 | 8/2001 | Snyder | | |
| 6,328,459 | B1 * | 12/2001 | Adams | F16L 3/237 | 362/396 |
| 6,663,069 | B1 | 12/2003 | Norberg | | |
| 7,080,925 | B1 * | 7/2006 | Rushing | F21V 21/00 | 362/396 |
| 7,249,866 | B1 * | 7/2007 | Tai | F21V 21/008 | 362/147 |
| 8,313,215 | B1 * | 11/2012 | Wawak-Umscheid | F21V 21/08 | 362/389 |
| 8,485,690 | B1 * | 7/2013 | Garcia | F21V 17/007 | 362/396 |
| 10,641,470 | B1 * | 5/2020 | Smyth | F21V 21/0816 | |
| 11,029,004 | B2 * | 6/2021 | Kennedy | F21V 21/0816 | |
| 11,927,327 | B1 * | 3/2024 | Scheurle | H02G 3/32 | |
| 2003/0185006 | A1 * | 10/2003 | Gordon | F21V 21/22 | 362/249.01 |
| 2004/0145894 | A1 * | 7/2004 | Long | F21S 4/10 | 362/147 |
| 2007/0008724 | A1 * | 1/2007 | Raska | F21S 4/10 | 362/249.16 |
| 2007/0041189 | A1 * | 2/2007 | Mchinnis | F21S 4/10 | 362/249.04 |
| 2007/0097701 | A1 * | 5/2007 | Vaught | F21V 21/08 | 362/249.14 |
| 2011/0069489 | A1 * | 3/2011 | Golembiowski | F21V 21/00 | 428/7 |
| 2017/0114988 | A1 * | 4/2017 | Andretta-Pulera | F21S 4/26 | |

* cited by examiner

ARTICLE RETENTION SYSTEM

FIELD OF THE INVENTION

The present invention relates to the field of article retention and more specifically to the field of holiday decorations.

BACKGROUND

It is a holiday and an individual has decided to hang holiday string lights about a tree in his yard. Hanging lights takes an unusual amount of labor for such a seemingly simple task. According to the standard state of the art, a person that has decided to hang 5 meters of lights about a tree with a circumference of a half a meter must first find some way of steadying an end of the light string about the tree—which sometimes includes puncturing and hurting the tree. Now that a light string end has been steadied, the person takes the entirety of the unwound light string and wraps the light string around the tree (unless, of course, in the rare situations whereby the tree is smaller than the individual). One pass of lights has been wound around the tree, leaving 4.5 meters of lights unwound. Then the 4.5 meters of lights must be wound around the tree for the second pass, leaving 4.0 meters for the next wind. The act continues, with the person physically circling the tree as the winds the lights in a dizzying ballet of decoration work.

It would be helpful if there were a means of applying lighted strings to a tree, or other organic or large body, without having to work with the entirety of the string at each pass, and does not require re-orienting one's body in concert with the string pass.

SUMMARY

The present invention is directed to a lighting system, process, and article retention system. The aforementioned problems are solved with the present invention, which allows an individual to apply lighted strings to a tree, or other entity, while remaining physically stationary and while working with only the portion of the string that needs to be hung at that moment. Furthermore, the tree remains unharmed throughout the hanging and ornamental display and removal process.

The lighting system includes a substantially cylindrical entity, such as a tree. An article retention system includes a substantially flexible linear band body with a body length defining multiple concave grips peripherally positioned upon each latitudinal extant of said band body, having a roughly latitudinal orientation, longitudinally positioned throughout a majority of the body length. The band body is pressed against the surface of the entity such that the body maintains a vertically linear orientation. An elastic bond can be adhered to the grips or to a series of dedicated clasps on the peripheral extents of the band body.

The spacing of the clasps (if present) and grips permits the elastic bond to be discontinuously wrapped about the entity. By discontinuous it is meant that there is not an overlap regarding the elongate thing, e.g. lighted string, that is being wrapped about the entity. Whereas the prior art featured helical wrapping, the present invention permits a serpentine longitudinal pattern whereby none of the extents of the serpentine pattern overlap one another. A lighted cord, is then discontinuously and releasably adhered about the grips, around said band body and the entity. The potential for a serpentine wrap pattern permits the cord and band to applied to the entity by a user in a stationary position.

A process of the present invention applies the retention system to the organic body.

A preferred version of the article retention system can be utilized with various articles of any dimension, rather than elongate string-like objects. Rather than wrap elongate pliable string-like objects about peripheral grasps, the article retention system is meant to be used with a pre-determined article. There are one or more grasps, which could be linearly arranged latitudinally and/or longitudinally, and the article has a void that is dimensioned to fit about the grasps to as to hang the article from the grasp about whatever entity is bearing the article.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figures 1A, 1B:
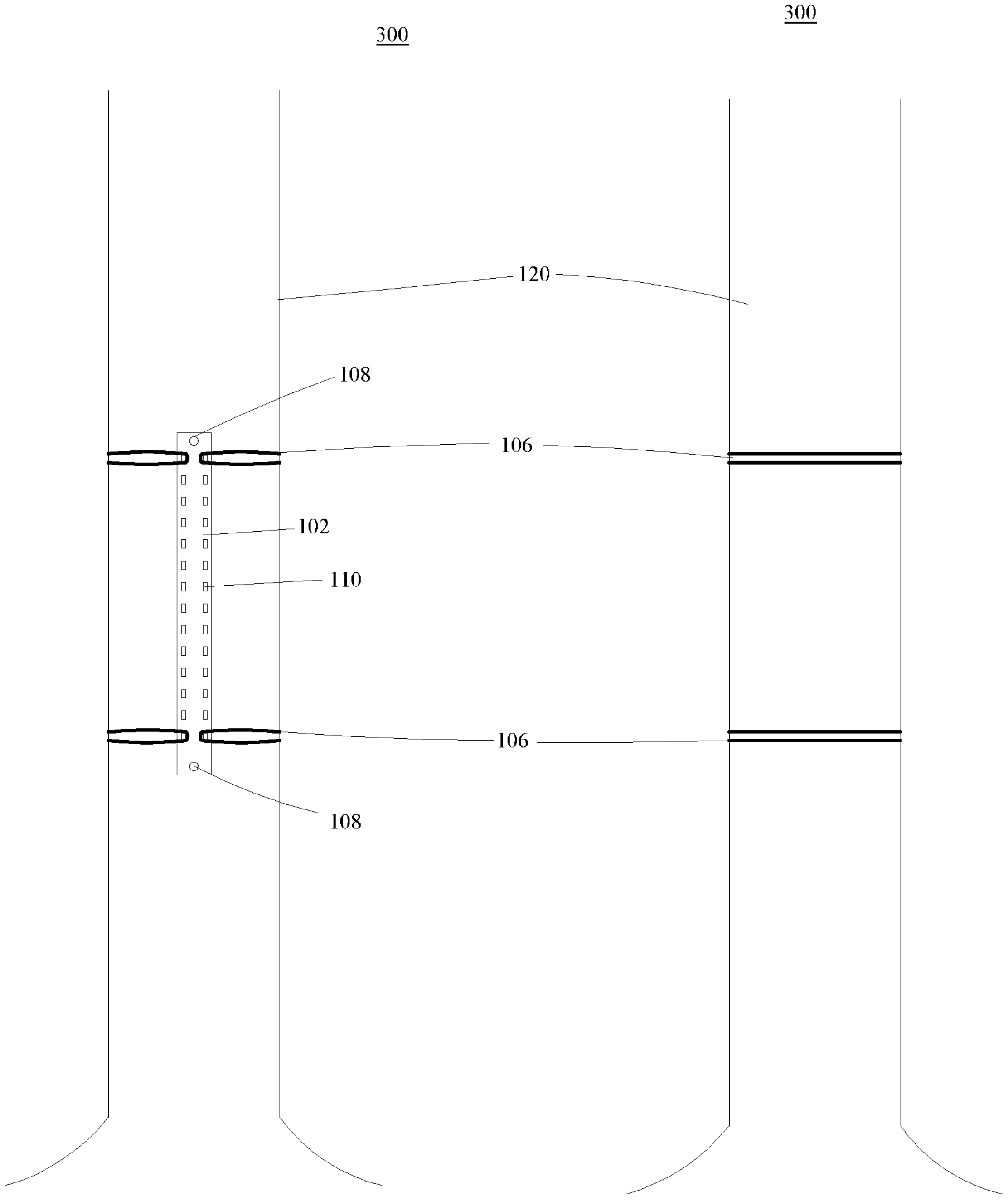
FIG. 1A is a front view of the retention system of the present invention about a hanging entity.
FIG. 1B is a rear view of the retention system of the present invention about a hanging entity.

Referring first to FIGS. 1-4, a basic embodiment of the article hanging system 300 is shown. It is best to discuss the system 300 in terms of its application to hanging a generic article. The present invention is particularly suited to hanging pliable elongate objects 140, particularly decorative lighted strings. The general lighted string suited to the present invention includes a series of light bulbs that are connected in a circuit, the sheathing of which forms the cording by which the lights can be hung. It is this circuit that is so cumbersome to hang around a tree, post, or other hanging entity 120. By hanging entity 120, it is meant the entity about which the hanging article, here the elongate object 140, is meant to be fastened. Trees, as a preferred hanging article, exhibit the attributes by which the present invention is ideally suited.

The present invention includes an article retention system 100 that includes a band with a band body 102 and grips 110. The band body 102 is preferably fabricated to be an elongate strip of pliable material that allows the body to bear a substantial quantity of retention lateral retention grips 110. The preferred material of manufacture includes a plastic and the degree of elasticity allows the body 102 to be folded in upon itself such that the longitudinal extents are capable of touching. The grips 110 are integrated into to the body 102 such that the point where the grip 110 becomes body 102 cannot be readily distinguished. The grips 110 project out of the height of the body 102 such that when the body 102 is pressed against a surface the grips 110 extend radially outward.

The grips 110 of the present invention preferably include hooks that are integrated with and project from the band body 102 such that the retention system 100 can be molded of a single material in a minimum number of steps. Unlike the body 102, the grips should have a thickness that minimizes elasticity and contortion. Although elasticity may be preferred for certain versions of the present invention that utilize light-weight elongate objects 140 (e.g., holiday lights), for other versions of the invention that utilize a dedicated article, the grips and their elasticity should be crafted to support that article. For example, a clock, Claymore mine, trail cameras, miniature basketball goal, etc, needs to maintain a constant orientation and accordingly a grip that sags due to weight would often diminish the utility of the articles.

The band body 102 includes a strip of plastic or other elastic material that allows a significant degree of contortion. The preferred degree of contortion allows the body 102 to twist longitudinally and bend at any point along the longitudinal span such that the band body 102 can form a circle wherein interconnectors 108, or "interconnection points," can join together the longitudinal extents of the body 102. The elasticity of the latitudinal extents can also possess significant elasticity that allows the latitudinal extents to contact one another. However, there is less functionality in having the latitudinal extents of the body being capable of contacting one another; if such elasticity were present, then there might be certain situations wherein such functionality may be helpful (e.g., thin rods as a hanging entity).

Turning now to FIGS. 5-9, a preferred version of the article retention system 100 is depicted. The retention system 100 takes the form an elongate strip wherein the band body 102 is thin and is elastic throughout. At the longitudinal ends of the band body 102 are interconnectors 108 that include mating protrusion and aperture points. The protrusion interconnector 108 (at the top) takes the form of a knob extending from the surface of the band body 102. The knob interconnector 108 is dimensioned to fit into the aperture interconnector 108 (at the bottom) such that the knob forms an interference fit with aperture at the knob/aperture sides. The knob aperture combination can serve multiple functions, principally to stabilize the position of one band body end with the other band body end, or one band body end with another, distinct retention system's band body end. Accordingly, multiple article retention systems 100 can be laid end to end for the length necessary to achieve the purposes of the user in retaining one or more articles on a hanging entity 120. Accordingly, because the preferred construction material of the band body 102 is an elastic material, the interconnector knob can be constructed of the same material as the band body such that they can be manufactured from a single molding process step.

The interconnectors 108 can further serve as an affixation system in such instances wherein more than stabilization is desired. Because the article retention system 100 is principally envisioned to be compressed against a hanging entity, many of which are composed of hard materials (e.g., trees/wood), the interconnectors do not necessarily need to be capable of affixing band bodies in a manner that survives significant pressure absent the hanging entity. In such situations wherein the interconnectors should both stabilize and affix the article retention system(s), the interconnector knobs can be composed of a ribbing that actively opposes as a physical impediment dislocation of one band body 102 with itself or another band body.

Figure 8:
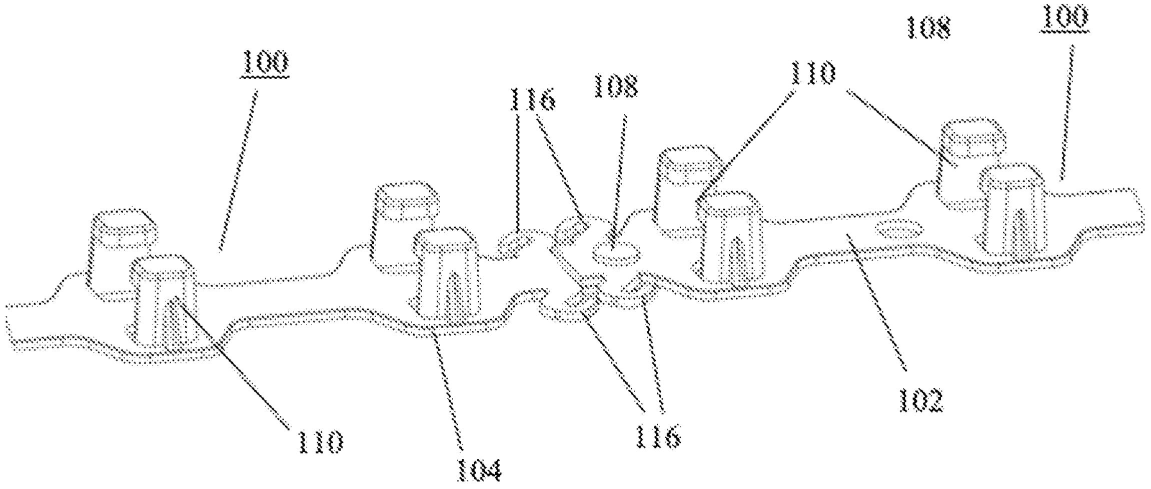
FIG. 8 is a side perspective view of multiple adjoining retention systems of the present invention.
Figure 9:
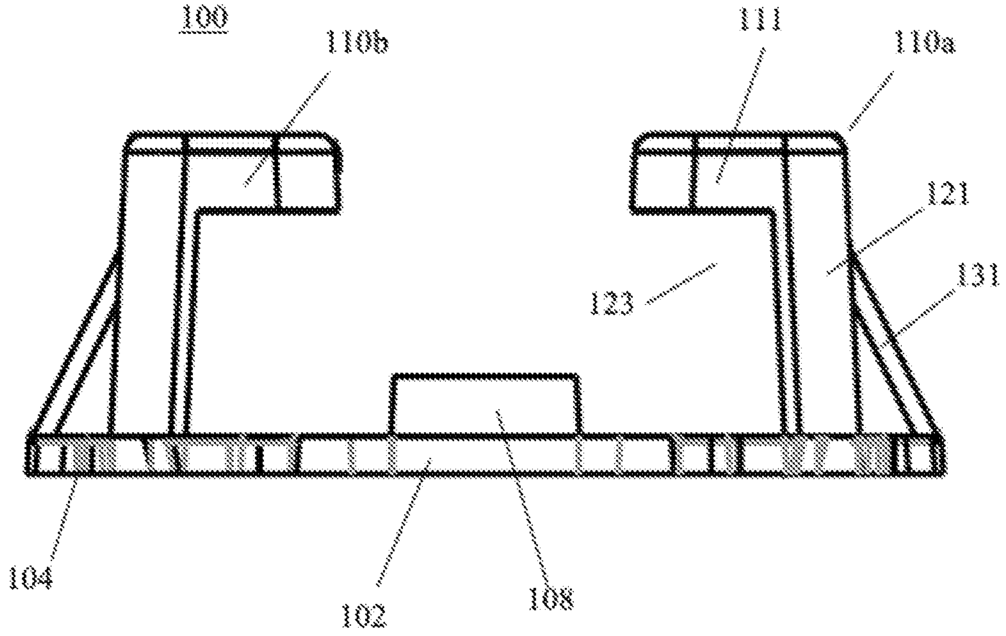
FIG. 9 is a longitudinal view of the retention system of the present invention.

As shown in particular in FIGS. 8-9, the grip(s) 110 of the article retention system 100 are adapted to support an article, and the form of the grip can vary to suit the article intended to supported by the grip 110. A primary embodiment of the present invention is suited to support holiday lights, depicted herein in FIGS. 1-4 as an elongate object 140. One of the benefits of the present invention is that the article retention system 100 can be positioned against a tree 120 and the retaining happens on one side of the tree. The article retention system 100 can be supported with bonds 106 dedicated to this purpose, but the nature of holiday lights and other string-like objects is that the object being 'hung' can supply the necessary retention of the system 100. The bonds 106 of the present invention can include any of means of supporting the article retention system 100 in a self-supporting and stationary fashion. Exemplary and ideal bonds 106 include nylon bungee cords similar to the those utilized in supporting materials in conventional pickup truck beds. The basis for terming these retaining devices "bonds" is supported by the notions of the present invention that these retaining devices do not pierce the hanging entity, e.g. a tree. One of the great problems found in the prior is based in the notion that hanging-assistance devices can be harmful to natural hanging entities, e.g. trees, or property, e.g. signposts. Because the bonds do not pierce the hanging entity, the bonds are considered "nonpenetrable" to the hanging entity. This need not imply that the bonds cannot be centrally located or in an interior position, but rather that the bonds do not penetrate a surface of the hanging entity. In other embodiments of the present invention, bonds can be any entity that supports the retention system 100, irrespective of penetration. In simpler versions of the present invention, the nonpenetrable bonds can include inelastic (i.e., standard) rope.

The preferred bonds 106 of the present invention attach releasably to the grips 116 of the retention system 100. The grips 116 of the retention system 100 can be any structure configured to retain bonds 106 capable of being used with the present invention. As shown in FIGS. 5-8, the preferred grips 116 are integrated to the body 102 and take the form of hooks bearing internal concavities to physically retain the bonds. Grips that rely on physical retention are preferred, as these maintain the simplicity spirit of the present invention; however, any form of grip that can retain the position of the bonds, in whatever form, may be utilized, including less conventional means of support, e.g. magnetic grips with bonds bearing magnetic ends that rely on contact for support. Furthermore, the preferred grips are positioned on the longitudinal extents of the body 102, although any position that achieves the purposes of the present invention may be utilized, including for example a single row of middle grips. The grips of the body, particularly those utilizing physical grips, are preferably positioned on the latitudinal extents of the body 102. The grips can be elastic or rigid such as best supports the body 102 in a stable position on the hanging entity 120.

The preferred grips 110 are emphasized in FIG. 9. The grips 110 of the preferred embodiment of the retention system 100 are simplistic concavity-based physical units of retention. To improve manufacturing simplicity the grips 110 are integrated into the body 102 and include a stem 121 that juts radially from the body 102 in a substantially straight orientation. Projections 111 extend internally back into the body 102. This forms a grip area 123 that when used with taut hanging articles (not shown) creates a physical impediment to the loosening of the hanging articles. The grips 110 can form interiorly facing units 110*b*, 110*a* such that any wrapping of a hanging article into the interior of the body 102 can result in contact with a grip so long as the hanging article, if elongate, advances a substantial distance longitudinally along the body 102. In the preferred embodiments of FIGS. 5-9, the retention article 100 includes symmetric grips 110*a*, 110*b* that provide a significant degree of options in positioning an elongate article (not shown). However, as shown in FIGS. 1-4, to generate the spiraling elongate article 140 that is popular in holiday decorations, offsetting grip configurations may be utilized so that the grips alternate positions longitudinally up the body 102.

Turning now to FIGS. 10, 14-17 the present invention includes a retention system 100 that presents a single medial column of longitudinal grips 110. These grips 110 need not rely on the "hook" configurations of earlier-discussed grips and can rely on "toadstool" type grips 110 that allow a user to wind the elongate article (not shown) prior to extending the article latitudinally around the hanging entity. In the depicted version of the present invention an elongate article cannot be discontinuously wrapped along an elongate article as was the case in FIGS. 1-9. By discontinuous it is meant that there is not an overlap regarding the elongate article, e.g. lighted string, that is being wrapped about the hanging entity. Whereas the prior art featured helical wrapping, the present invention permits a serpentine longitudinal pattern whereby none of the extents of the serpentine pattern overlap one another.

Figure 10:
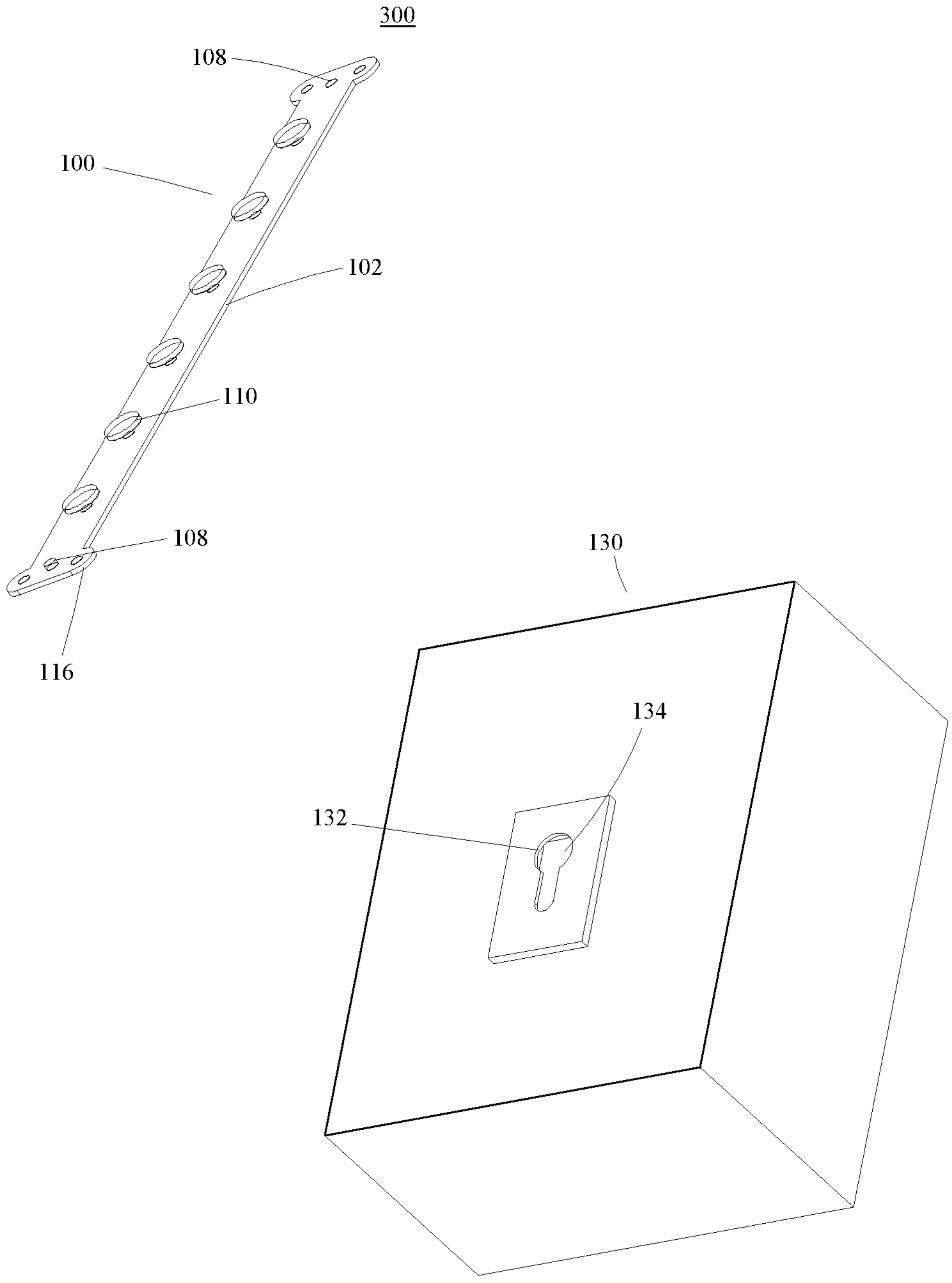
FIG. 10 is a perspective view of the tailored system of the present invention.
Figure 11:
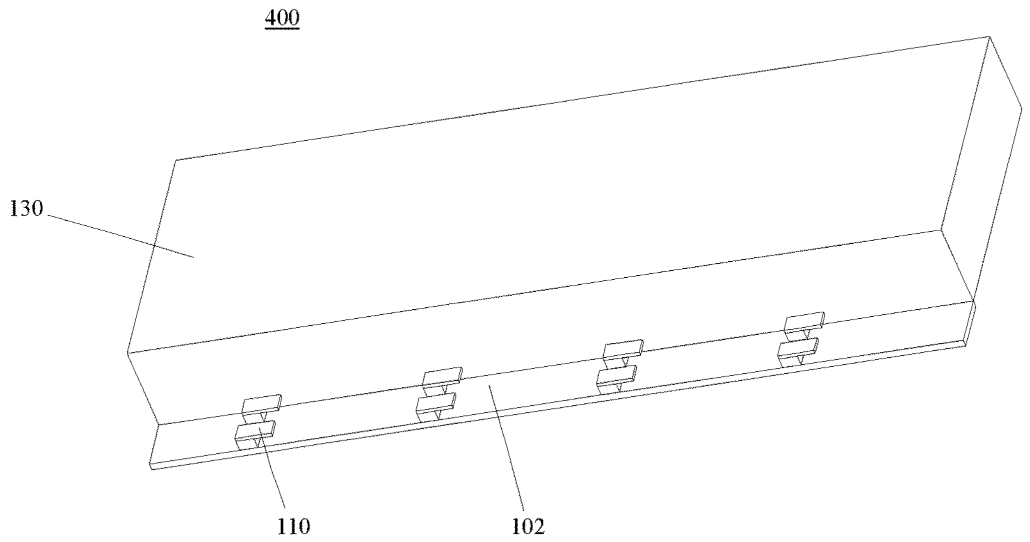
FIG. 11 is a perspective view of the kit of the present invention.
Figure 12:
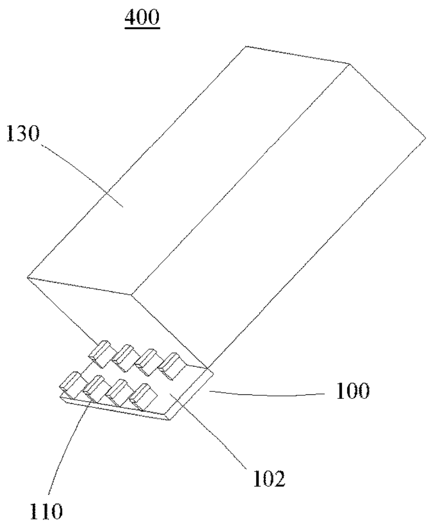
FIG. 12 is a side perspective view of the kit of the present invention.
Figure 13:
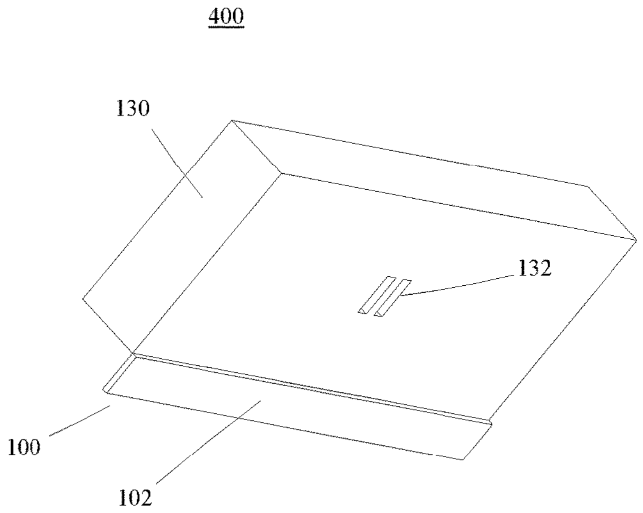
FIG. 13 is a rear perspective view of the kit of the present invention.

The particular advantage of the embodiment of FIG. 10 is based more in the application of entities that are not capable of support via winding. In this tailored article system 300 embodiment of the present invention the retention system body 102 includes grips 110 bearing a shape adapted to snugly within a hanging article 130 having an article aperture 132 sized to retain the article 130 is a static position about a hanging entity (not shown) without drooping or loose affixation. This secure support, as shown by FIGS. 14-17 result from an article aperture 132 that is sized to form either a close-fit or interference-fit relationship with the grip 110. This is the basis of the designation of the embodiment as a "tailored" system. The grip 110, rather than sized to fit a general article, is dimensioned by its physical dimensions to fit so closely within a fit space 134 contiguous to the aperture 132 that multiple surfaces of both the body 102 and the article 130 contact either other to mutually prevent article drooping or looseness. By close fit, it is meant that the fit is such that the article 130 fits about the grip 110 to place the surfaces of the grip 110 in direct, or negligibly distant, contact with the article aperture fit space 134. By interference fit, it is meant that the grip 110 bears dimensions that prior to deformation prevent direct penetration of the grip 110 into the aperture 134. As shown in FIG. 10, the tailored embodiment depicts a key slot arrangement whereby the toadstool grip can directly fit within the upper portions of the article aperture 134 while having physical dimensions that allow the grip 110 to slide downward into the fit space. Thereby gravity holds the (upper) protrusion portion of the grip 110 into direct contact on multiple surfaces in the fit space 134 of the article such that the article 130 cannot be moved by direct outward force, but rather the article must first be lifted and then pulled away from the body 102 and grips 110. For the tailored embodiment, there need only really be one grip 110 because the nature of the present invention is such that the body 102 can be positioned at will upon the surface of an entity. The tailored embodiment can apply to any article 130 for which it is advantageous to be attached to an entity but potentially removed at a later point, or for an article to be indefinitely stabilized in a secure position. The article of this embodiment is not meant to be limited to any particular article, but rather the only restrictions apply to the apertures on the rearward surface of the article having dimensioned adapted to mate with the grips of the body. Examples of articles 130 of the present invention can vary wildly, and extend from the serene, e.g. a birdhouse, to the violent, e.g. a Claymore directed explosive device. Any article that requires stable positioning upon an entity without damaging the entity or that is beneficially hung from an entity quickly and readily.

Figure 14:
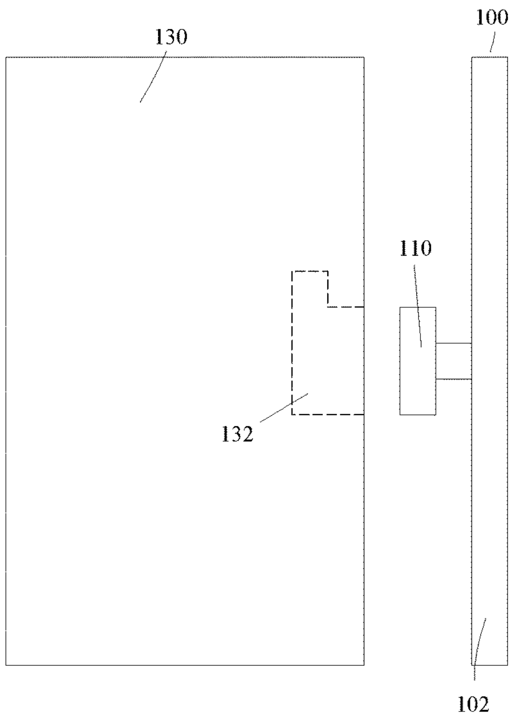
FIG. 14 is an exposed diagram view of the tailored system of the present invention.
Figure 15A:
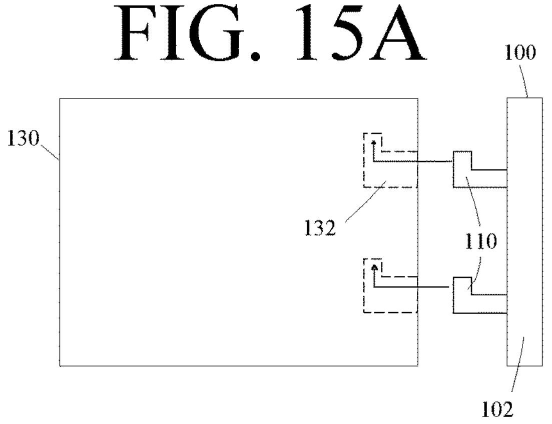
FIG. 15A is an exposed diagram view of the tailored system of the present invention.
Figure 15B:
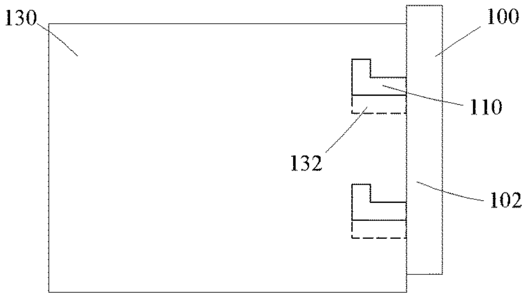
FIG. 15B is an exposed diagram view of the tailored system of the present invention.
Figure 16:
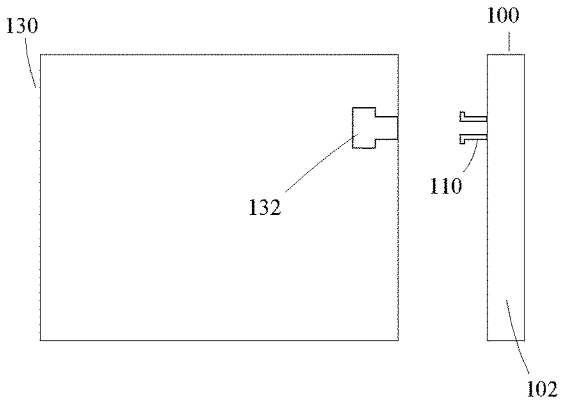
FIG. 16 is an exposed diagram view of the tailored system of the present invention.
Figure 17:
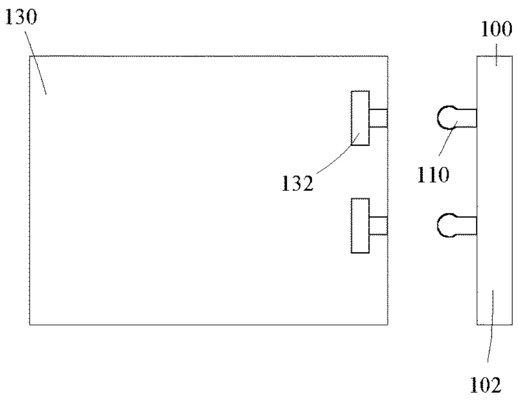
FIG. 17 is an exposed diagram view of the tailored system of the present invention.

As shown in FIGS. 14-17, the "mating" fit can be achieved by any male-female/positive-negative space that results in a stable and secure fit between the article and the retention system. FIGS. 14, 15A, 15B depict versions of the embodiment that rely on close fit relationships, while FIGS. 16-17 depict interference fit versions of the present invention. Interference fit versions of the invention ought to have at least grips 110 that are capable of material deformation.

A kit 400 of the present invention includes the article 130 and system 100 of FIGS. 10, 14-17 but with the retention system 100 releasably affixed to the article 130. Since the tailored embodiment 300 features a grips 110 that are purposefully dimensioned to retain the article (which has purposefully crafted apertures 132 to fit the grips 110). Accordingly one or more of the retention systems 100 can be releasably affixed to an exterior surface of the article. For example a birdhouse or sign, as an article 130, can be sold as a kit 400 with a retention system 100 dimensioned to support it. Accordingly a sign can be readily hung upon a pole, or even a tree, without damaging the pole (or tree).

Figure 2A:
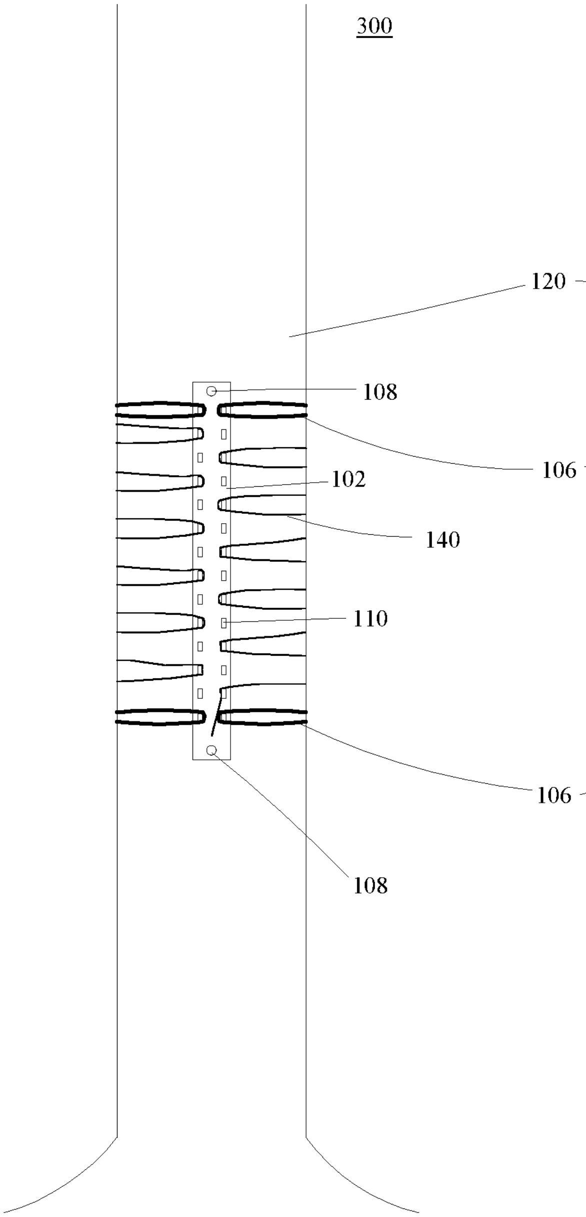
FIG. 2A is a front view of the retention system of the present invention about a hanging entity.
Figure 2B:
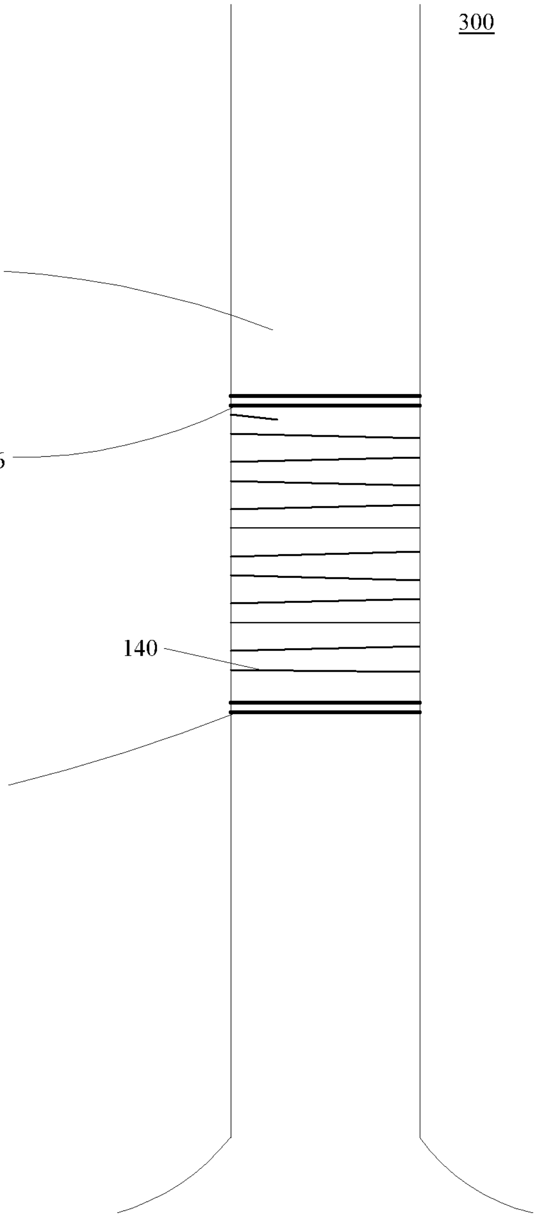
FIG. 2B is a front view of the retention system of the present invention about a hanging entity.
Figure 3A:
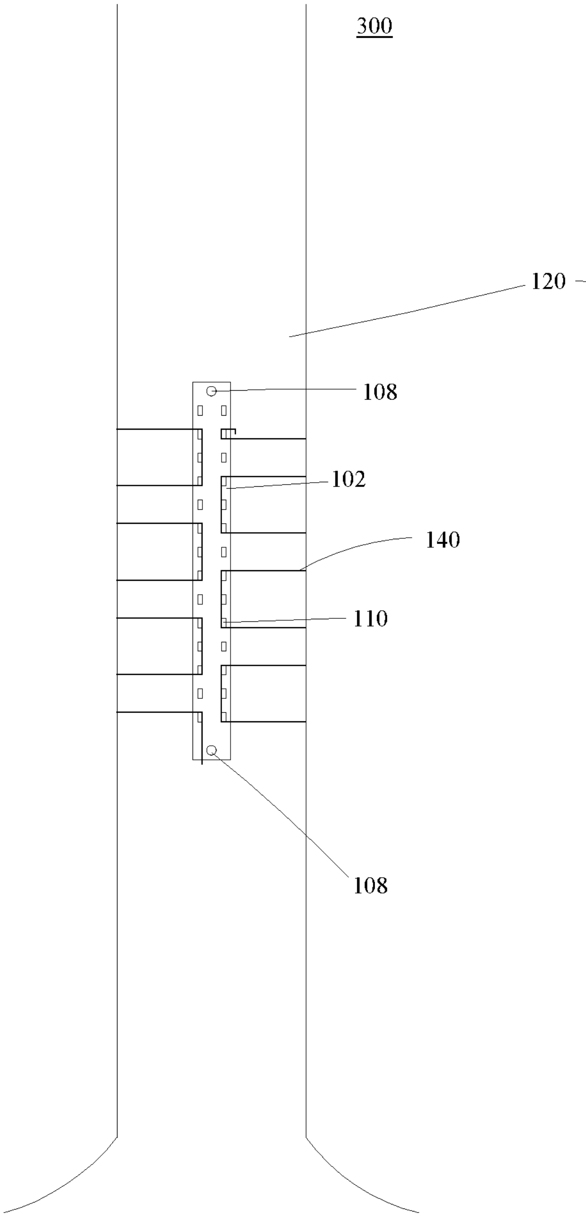
FIG. 3A is a front view of the retention system of the present invention about a hanging entity.
Figure 3B:
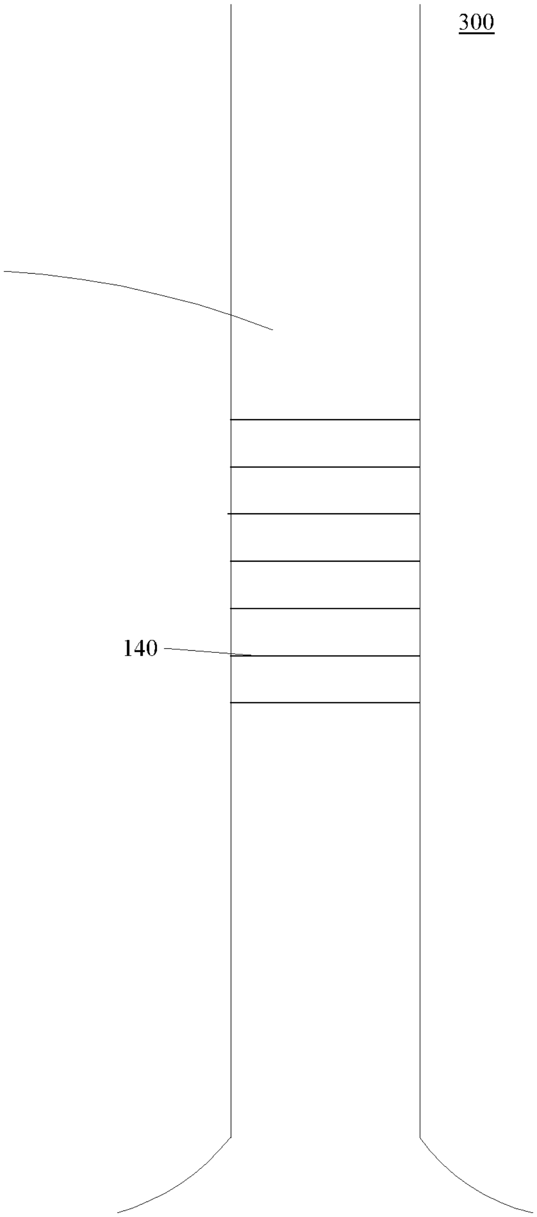
FIG. 3B is a front view of the retention system of the present invention about a hanging entity.
Figures 4A, 4B:
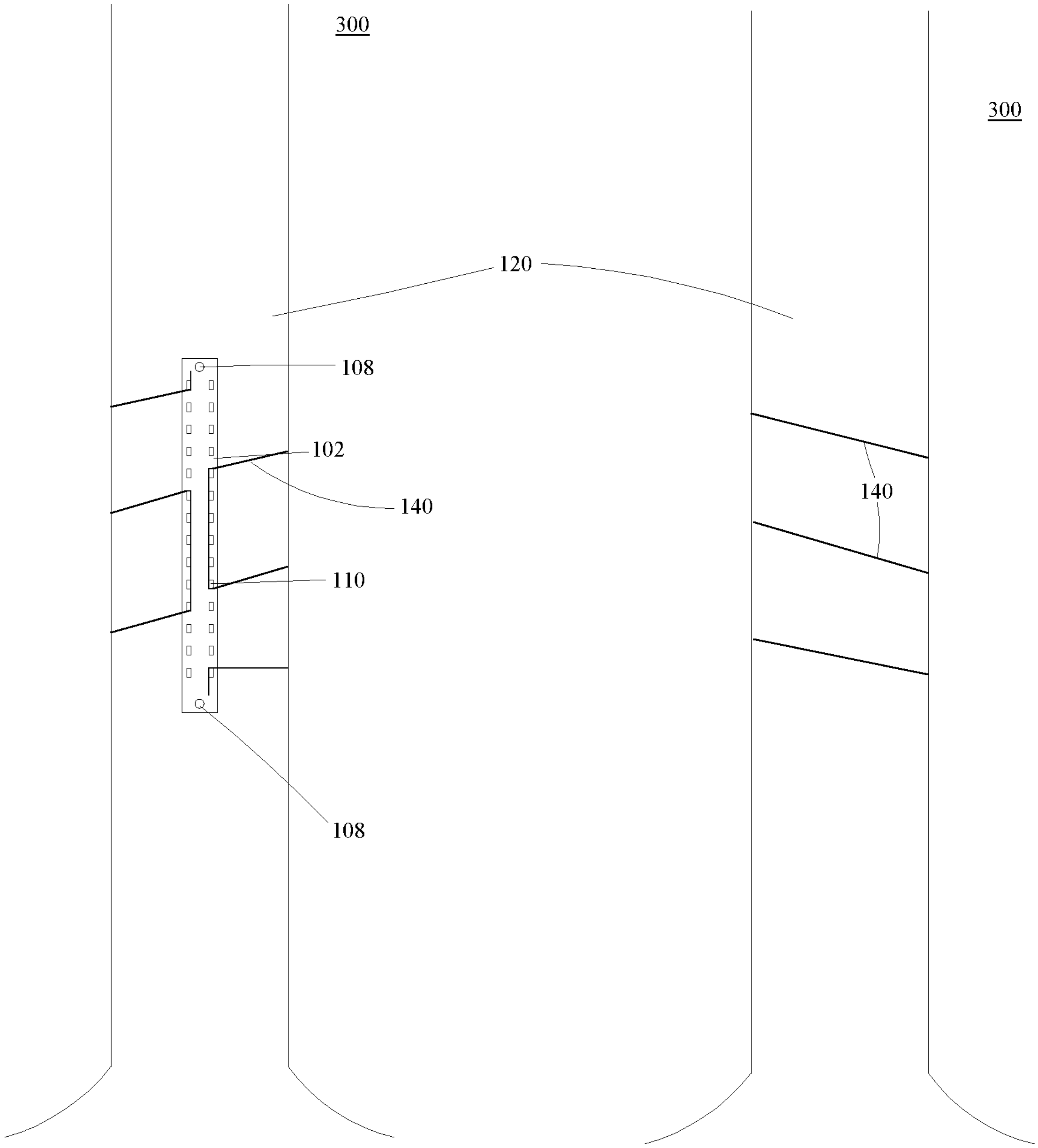
FIG. 4A is a front view of the retention system of the present invention about a hanging entity.
FIG. 4B is a front view of the retention system of the present invention about a hanging entity.
Figure 5:
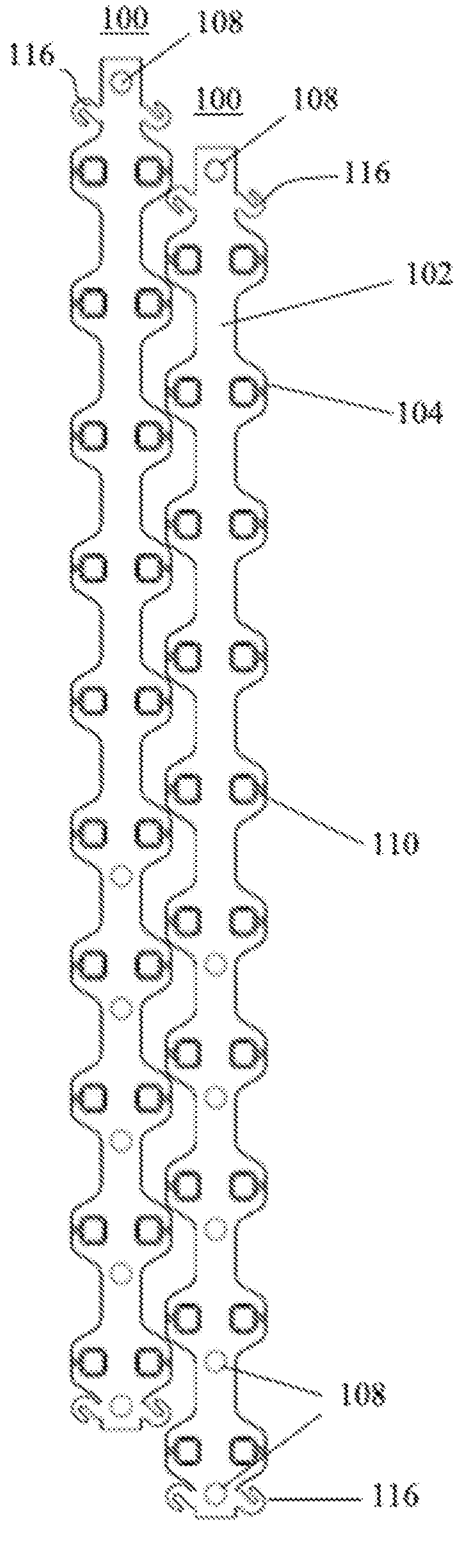
FIG. 5 is a top view of multiple retention systems of the present invention.
Figure 6:
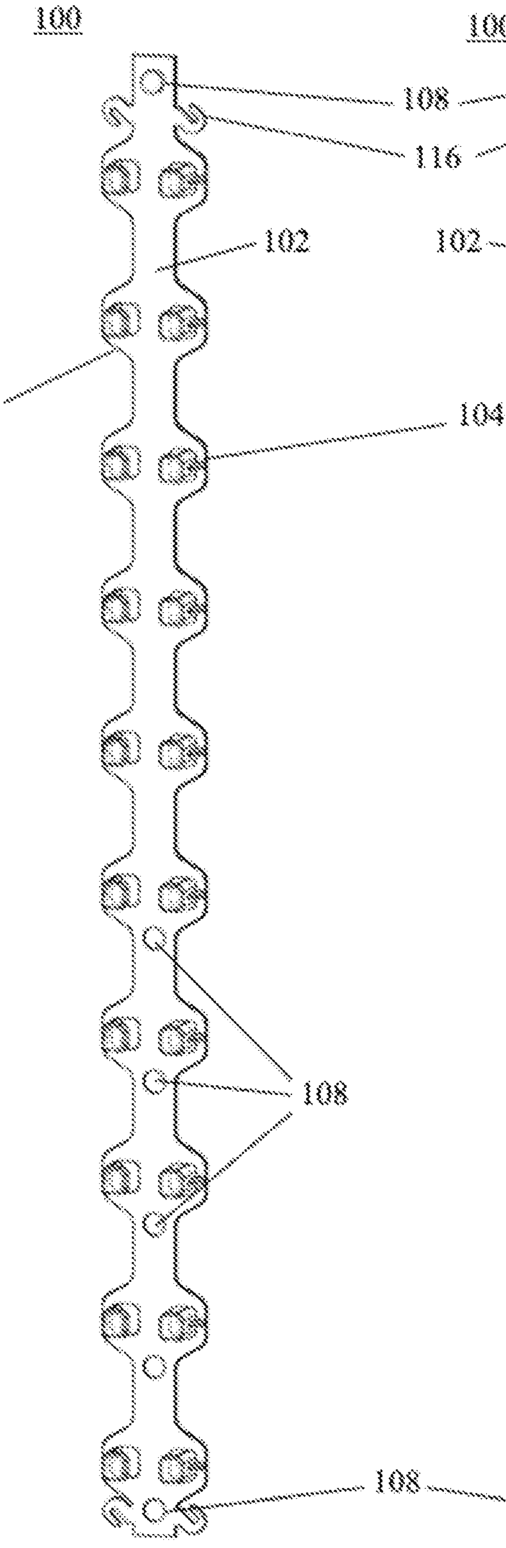
FIG. 6 is an upper peripheral view of the retention system of the present invention.
Figure 7:
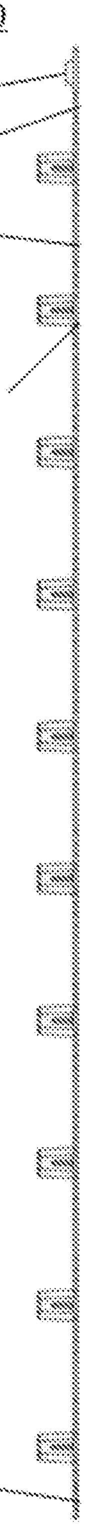
FIG. 7 is a side view of the retention system of the present invention.

The present invention is often discussed in the amount of longitudinal area that can be occupied by the grips. It is preferred in decorations involved long, bendable decorations (e.g. light strings) that the grips occupy a portion of the body sufficient to permit a light, cord, or other elongate object 140 to be wrapped around the article retention system body throughout a substantial portion of the body, longitudinally. This is not to be understood to mean that the grips themselves occupy such space, but rather that the grips are positioned on the body to allow the object to occupy such longitudinal space. As can be seen in FIGS. 1-3, the grips 110 perhaps occupy some 20-30% of the space of the body (facing outward from the tree), yet allow the elongate object 140 the ability to be wrapped discontinuously through roughly 90% of the longitudinal (here, height) extents of the body 102. Here, this is achieved through approximately twenty or so rows of grips, but even if merely two rows of two grips were utilized at the lowest and highest portions, the elongate cord would nonetheless occupy the same longitudinal space; however, the décor would be highly lacking as a minimal quantity of 'wraps' would be achieved. It is preferred that with such elongate objects, the grips permit the present invention to cover a majority of the longitudinal space from top to the bottom of the body. It is preferred, to maximize material effectiveness and efficiency, that as close as possible to one hundred percent of the longitudinal space is utilized, but the present invention can be utilized to occupy longitudinal space in such embodiments as low as 10%. In versions of the present invention, such as those shown in FIGS. 10-17, there is no such need to be concerned with longitudinal space. However, in other versions, the wrapping achieved by a 'full' set of grips 110 further adds to the stability of an invention that affixes to, for example, a tree, without puncturing the tree.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An article hanging device, comprising:

a band body comprising a front face, wherein the front face has a left side and a right side; and a plurality of grips integrally attached to the front face of the band body, wherein the plurality of grips extend in a generally perpendicular direction outward from the front face of the band body, wherein each of the plurality of grips have an interior face facing towards an interior region of the article hanging device, wherein the interior region is located between the left side of the front face and the right side of the front face, wherein each of the plurality of grips have a characteristic to resist lateral contortion, wherein the plurality of grips comprise a projection, wherein the projection extends in a generally perpendicular direction from the given of the plurality of grips and a generally parallel direction with respect to the band body;

wherein a subset of the plurality of grips are located towards the left side of the front face and wherein a second subset of the plurality of grips are located towards the right side of the front face.

2. The article hanging device of claim 1, wherein the subset of the plurality of grips are offset longitudinally as compared to the second subset of the plurality of grips.

3. The article hanging device of claim 1, wherein the subset of the plurality of grips are located symmetrically longitudinally as compared to the second subset of the plurality of grips.

4. The article hanging device of claim 1, wherein each of the plurality of grips comprises at least one of the projections and wherein the projection is located towards a top portion of a given of the plurality of grips and extends from the given of the plurality of grips towards the interior region of the band body.

5. The article hanging device of claim 1, further comprising at least one elastic bond adapted to discontinuously adhere said article hanging device to an object.

6. The article hanging device of claim 5, wherein the elastic bond is attached to and contacting the interior face of a first grip of a first subset of the plurality of grips, wrapped around the object, and attached to and contacting the interior face of a second grip of a second subset of the plurality of grips to hold the article hanging device to the object.

7. The article hanging device of claim 1, wherein the band body is manufactured from a material allowing the band body to twist longitudinally.

8. The article hanging device of claim 1, wherein, when a hanging article is attached to one of the plurality of grips of the article hanging device, the hanging article contacts the interior face of the one of the plurality of grips.

9. The article hanging device of claim 1, further comprising interconnectors located at substantially a top side of the front face and a bottom side of the front face.

10. The article hanging device of claim 9, wherein the interconnectors comprise a mating protrusion and an aperture point, wherein one of the mating protrusion and the aperture point is located at one of the top side and the bottom side and wherein the other of the mating protrusion and the aperture point is located at the other of the top side and the bottom side.

11. The article hanging device of claim 10, wherein the mating protrusion of a first article hanging device mates to the aperture point of a second article hanging device to connect the first article hanging device and the second article hanging device.

12. The article hanging device of claim 1, wherein the interior face of the each of the plurality of grips comprises a concave interior face.

13. An article hanging system, comprising:

a plurality of article hanging devices, each of the plurality of article hanging devices comprising:

a band body comprising a front face, wherein the front face has a left side and a right side;

a plurality of grips integrally attached to the front face of the band body, wherein the plurality of grips extend in a perpendicular direction outward from the front face of the band body, wherein each of the plurality of grips have an interior face facing towards an interior region of the article hanging device, wherein the interior region is located between the left side of the front face and the right side of the front face, wherein each of the plurality of grips have a characteristic to resist lateral contortion; and interconnectors located at substantially a top side of the front face and a bottom side of the front face, wherein the interconnectors comprise a mating protrusion and an aperture point, wherein one of the mating protrusion and the aperture point is located at one of the top side and the bottom side and wherein the other of the mating protrusion and the aperture point is located at the other of the top side and the bottom side; and wherein the mating protrusion of a first of the plurality of article hanging devices mates to the aperture point of a second of the plurality of article hanging devices to connect the first article hanging device and the second article hanging device.

14. The article hanging system of claim 13, wherein each of the plurality of grips comprise a projection, wherein the projection is located towards a top portion of a given of the plurality of grips and extends from the given of the plurality of grips towards the interior region of the band body.

15. The article hanging system of claim 13, further comprising at least one elastic bond adapted to discontinuously adhere said article hanging device to an object, wherein the elastic bond is attached to and contacting the interior face of a first grip of the subset of the plurality of grips, wrapped around the object, and attached to and contacting the interior face of a second grip of the second subset of the plurality of grips to hold the article hanging device to the object.

16. The article hanging system of claim 13, wherein the band body is manufactured from a material allowing the band body to twist longitudinally.

17. The article hanging system of claim 13, wherein a subset of the plurality of grips are located towards the left side of the front face and wherein a second subset of the plurality of grips are located towards the right side of the front face, wherein the subset of the plurality of grips are offset longitudinally as compared to the second subset of the plurality of grips.

18. The article hanging system of claim 13, wherein a subset of the plurality of grips are located towards the left side of the front face and wherein a second subset of the plurality of grips are located towards the right side of the front face, wherein the subset of the plurality of grips are located symmetrically longitudinally as compared to the second subset of the plurality of grips.

19. The article hanging system of claim 13, wherein, when a hanging article is attached to one of the plurality of grips of the article hanging device, the hanging article contacts the interior face of the one of the plurality of grips.

* * * * *